US012507016B2

(12) United States Patent
Linghu et al.

(10) Patent No.: US 12,507,016 B2
(45) Date of Patent: Dec. 23, 2025

(54) SOUNDING DEVICE

(71) Applicant: AAC Microtech (Changzhou) Co., Ltd., Jiangsu (CN)

(72) Inventors: Ronglin Linghu, Changzhou (CN); Bo Xiao, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 152 days.

(21) Appl. No.: 18/624,082

(22) Filed: Apr. 1, 2024

(65) Prior Publication Data

US 2025/0211911 A1 Jun. 26, 2025

Related U.S. Application Data

(63) Continuation of application No. PCT/CN2023/142024, filed on Dec. 26, 2023.

(51) Int. Cl.

*H04R 25/00* (2006.01)
*H04R 7/16* (2006.01)
*H04R 9/02* (2006.01)
*H04R 9/06* (2006.01)

(52) U.S. Cl.

CPC ............... *H04R 9/025* (2013.01); *H04R 7/16* (2013.01); *H04R 9/06* (2013.01)

(58) Field of Classification Search

CPC ............. H04R 9/025; H04R 7/16; H04R 9/06
USPC .......................................................... 381/398
See application file for complete search history.

(56) References Cited

U.S. PATENT DOCUMENTS

2005/0031153 A1* 2/2005 Nguyen ................. H04R 9/025 381/400
2020/0045451 A1* 2/2020 Zhang ....................... H04R 9/06
2024/0073620 A1* 2/2024 Ren .......................... H04R 9/06

* cited by examiner

*Primary Examiner* — Phylesha Dabney
(74) *Attorney, Agent, or Firm* — Wiersch Law Group

(57) ABSTRACT

The present application provides a sounding device, including a basket frame, a vibration system including a diaphragm, a first voice coil and a second voice coil, and a magnetic circuit system; the first voice coil and the second voice coil are inserted and suspended within a first magnetic gap and a second magnetic gap, respectively. The magnetic circuit system includes a lower clamping plate, a first center magnetic steel and a second center magnetic, and an irregular edge magnetic steel; the irregular edge magnetic steel includes a side magnet body, a first sub-magnetic steel, and a second sub-magnetic steel; the first sub-magnetic steel and the second sub-magnetic steel are located in a side of the first center magnetic steel and a side of the second center magnetic steel, respectively. Compared to the prior art, the sounding device of the present application has good acoustic performance.

9 Claims, 8 Drawing Sheets

A-A

B--B

SOUNDING DEVICE

CROSS-REFERENCE TO RELATED APPLICATIONS

This application is a continuation of International Application No. PCT/CN2023/142024, filed on Dec. 26, 2023, the entire contents of which are incorporated herein by reference.

TECHNICAL FIELD

The present application relates to the field of electro-acoustic conversion, in particular to a sounding device.

BACKGROUND

A sounding device is a transducer device for converting an electrical signal into an acoustic signal, and is mainly divided into two modes, namely, a single vibration system and a dual vibration system. The sounding device of the single vibration system mode mainly comprises a basket frame, a vibration system fixed to the basket frame and configured to emit sound, and a magnetic circuit system configured to drive the vibration system to vibrate.

In the sounding device of the related art in the single vibration system mode, the vibration system includes a diaphragm fixed to the basket frame and a voice coil configured to drive the diaphragm to vibrate. The voice coil is suspended in a magnetic gap of the magnetic circuit system, and the voice coil is driven to vibrate to produce sound by the magnetic circuit system. Therefore, in the sounding device in the related art, the diaphragm and the voice coil are correspondingly arranged to achieve the effect of sound production. However, in the sounding device of the related art, the driving force of the single voice coil is weakened, resulting in a decrease in the acoustic performance of the sounding device.

Therefore, it is necessary to provide a new sounding device to solve the above technical problems.

SUMMARY

An object of the present application is to provide a sounding device in which dual voice coils can be connected in both series and parallel, thereby obtaining greater driving force and improving acoustic performance.

In order to achieve the above object, the present application provides a sounding device, comprising:

a basket frame;

a vibration system, comprising a diaphragm fixed to the basket frame at an outer peripheral edge and a first voice coil and a second voice coil configured to drive the diaphragm to vibrate to produce sound; and a magnetic circuit system, wherein the magnetic circuit system is fixed to the basket frame, and is provided with a first magnetic gap and a second magnetic gap spaced apart on a side of the magnetic circuit system close to the vibration system; the first voice coil is inserted and suspended in the first magnetic gap, and the second voice coil is inserted and suspended in the second magnetic gap;

wherein the magnetic circuit system comprises a lower clamping plate, a first center magnetic steel and a second center magnetic steel fixedly stacked on the lower clamping plate and spaced apart from each other, and an irregular edge magnetic steel fixedly stacked on the lower clamping plate; the irregular edge magnetic steel is provided between the first center magnetic steel and the second center magnetic steel; the first sub-magnet is located on a side of the first center magnetic steel away from the irregular edge magnetic steel, and the second sub-magnetic steel is located on a side of the second center magnetic steel away from the irregular edge magnetic steel;

the irregular edge magnetic steel comprises a side magnet body, a first side magnet and a second side magnet formed by bending and extending both ends of the side magnet body respectively; wherein the side magnet body is spaced between the first center magnetic steel and the second center magnetic steel; the first side magnet is located at one same side of the first center magnetic steel and the second center magnetic steel, the second side magnet is located at the other same side of the first center magnetic steel and the second center magnetic steel; the side magnet body, the first side magnet, the first sub-magnetic steel, and the first center magnetic steel jointly enclose the first magnetic gap; the side magnet body, the second side magnet, the second sub-magnetic steel, and the second center magnetic steel jointly enclose the second magnetic gap.

In some embodiments, the first center magnetic steel comprises a first main magnetic steel fixedly stacked on the lower clamping plate, a first pole core fixedly stacked on the first main magnetic steel, and a first magnetic member fixedly stacked on the first pole core;

the second center magnetic steel comprises a second main magnetic steel fixedly stacked on the lower clamping plate, a second pole core fixedly stacked on the second main magnetic steel, and a second magnetic member fixedly stacked on the second pole core.

In some embodiments, the first magnetic member comprises a first magnetic member body fixedly stacked on the first pole core, and a tab-shaped first magnet extension portion formed by a protruding extension of a side of the first magnetic member body away from the first pole core;

the second magnetic member comprises a second magnetic member body fixedly stacked on the second pole core, and a tab-shaped second magnet extension portion formed by an extension of a side of the second magnetic member body away from the second pole core.

In some embodiments, the diaphragm comprises a vibrating portion, an outer folded ring in an annular shape and extending from an outer peripheral edge of the vibrating portion, a fixing portion extending from an outer peripheral edge of the outer folded ring and fixed to the basket frame, a first avoiding hole and a second avoiding hole spaced apart from each other and arranged through the vibrating portion, a first inner folded ring in an annular shape and extending from an inner peripheral edge of the first avoiding hole, a second inner folded ring in an annular shape and extending from an inner peripheral edge of the second avoiding hole, a first support portion extending from an inner peripheral edge of the first inner folded ring, and a second support portion extending from an inner peripheral edge of the second inner folded ring; wherein the first support portion is fixedly stacked on a side of the first magnetic member body close to the diaphragm, and the second support portion is fixedly stacked on a side of the second magnetic member body close to the diaphragm;

a first avoidance space is formed throughout the first support portion, and a second avoidance space is formed throughout the second support portion; the first magnet extension portion and the second magnet extension portion are arranged within the first avoidance space and the second avoidance space, respectively.

In some embodiments, the magnetic circuit system further comprises an upper clamping plate; the upper clamping plate is fixedly stacked on a side of the irregular edge magnetic steel close to the vibration system.

In some embodiments, the sounding device further comprises a skeleton, a skeleton, wherein the skeleton is provided with a first through-hole and a second through-hole oppositely arranged and formed throughout the skeleton; a side of the skeleton close to the vibration system is fixed to the diaphragm; the first voice coil and the second voice coil are fixed to a side of the skeleton away from the diaphragm and arranged around the first through-hole and the second through-hole, respectively; a side of the first center magnetic steel close to the vibration system and a side of the second center magnetic steel close to the vibration system are arranged through the first through-hole and the second through-hole, respectively.

In some embodiments, the skeleton comprises a skeleton body provided with the first through-hole and the second through-hole, and a first fixing portion and a second fixing portion formed by bending and extending from walls of the first through-hole and the second through-hole, respectively, to a side close to the magnetic circuit system; the skeleton body is fixed to the diaphragm, and the first voice coil and the second voice coil are fixed to a side of the first fixing portion close to the magnetic circuit system and a side of the second voice coil close to the magnetic circuit system, respectively.

In some embodiments, the sounding device further comprises an elastic support assembly; the skeleton further comprises an extension portion formed by bending and extending from opposite sides of the skeleton body toward the magnetic circuit system; one end of the elastic support assembly is fixed to the basket frame, and the other end of the elastic support assembly is fixed to the extension portion.

In some embodiments, the elastic support assembly comprises an elastic member and an auxiliary diaphragm; one end of the elastic member is fixed to the basket frame, the other end of the elastic member is fixed to the extension portion; and the auxiliary diaphragm is affixed and fixed to a side of the elastic member away from the vibration system.

Compared to the prior art, in the sounding device of the present application, a first voice coil and a second voice coil are provided in a single diaphragm, and the first voice coil and the second voice coil can be connected in series and in parallel. The irregular edge magnetic steel is provided between the first center magnetic steel and the second center magnetic steel, and the first sub-magnetic steel is located on a side of the first center magnetic steel away from the irregular edge magnetic steel, and the second sub-magnet steel is located on a side of the second center magnetic steel away from the irregular edge magnetic steel. The side magnet body of the irregular edge magnetic steel is spaced between the first center magnetic steel and the second center magnetic steel. The first side magnet is located on one same side of the first center magnetic steel and the second center magnetic steel, and the second side magnet is located on the other same side of the first center magnetic steel and the second center magnetic steel. The side magnet body, the first side magnet, the first sub-magnetic steel and the first center magnetic steel jointly enclose the first magnetic gap; the side magnet body, the second side magnet, the second sub-magnetic steel and the second center magnetic steel jointly enclose the second magnetic gap; the first voice coil and the second voice coil are driven by the corresponding first center magnetic steel and second center magnetic steel of the magnetic circuit system, respectively, thereby obtaining a larger driving force and improving the acoustic performance of the sounding device.

BRIEF DESCRIPTION OF THE DRAWINGS

In order to more clearly illustrate the technical solutions in the embodiments of the present application, the accompanying drawings that need to be used in the description of the embodiments will be briefly introduced as follows. Obviously, the accompanying drawings in the following description are only some of the embodiments of the present application, and for the person of ordinary skill in the field, other accompanying drawings can be obtained based on these drawings without putting forth any creative labor.

DETAILED DESCRIPTION OF THE EMBODIMENTS

The technical solutions in the embodiments of the present application will be clearly and completely described below in conjunction with the accompanying drawings in the embodiments of the present application, and it is clear that the described embodiments are only a part of the embodiments of the present application rather than all of the embodiments. Based on the embodiments in the present application, all other embodiments obtained by the person of ordinary skill in the field without making creative labor are within the protection scope of the present application.

Figure 1:
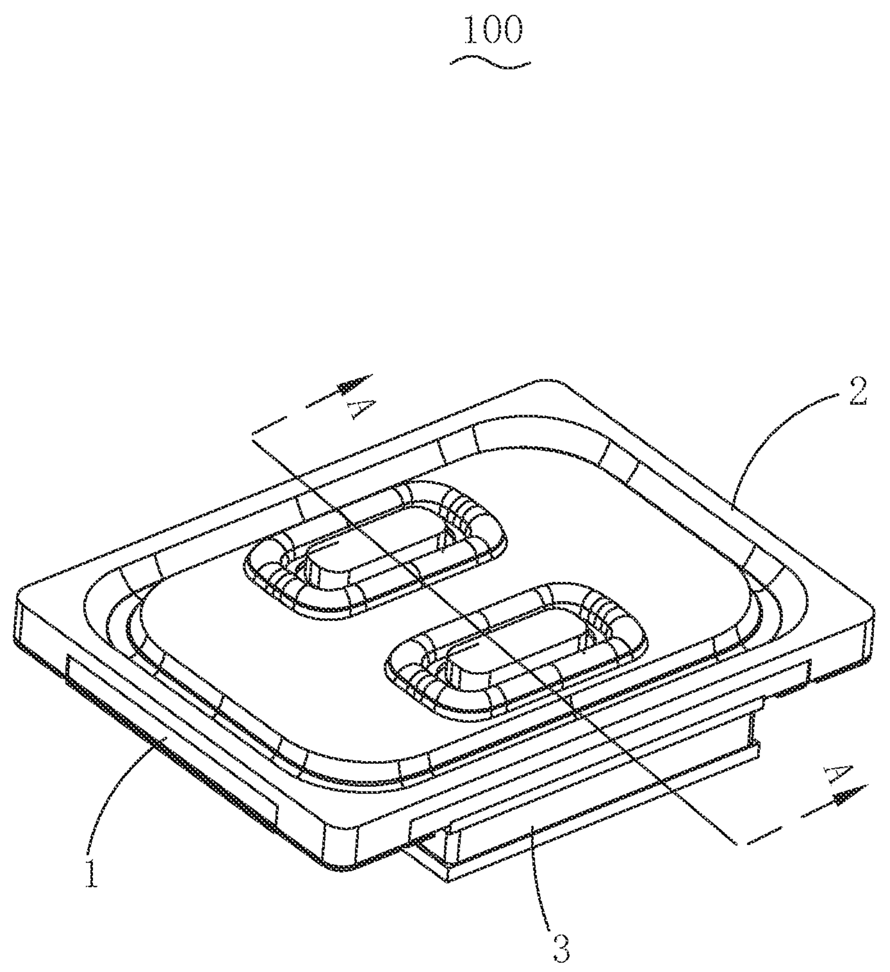
FIG. 1 shows a three-dimensional structural schematic view of a sounding device provided by an embodiment of the present application.
Figure 2:
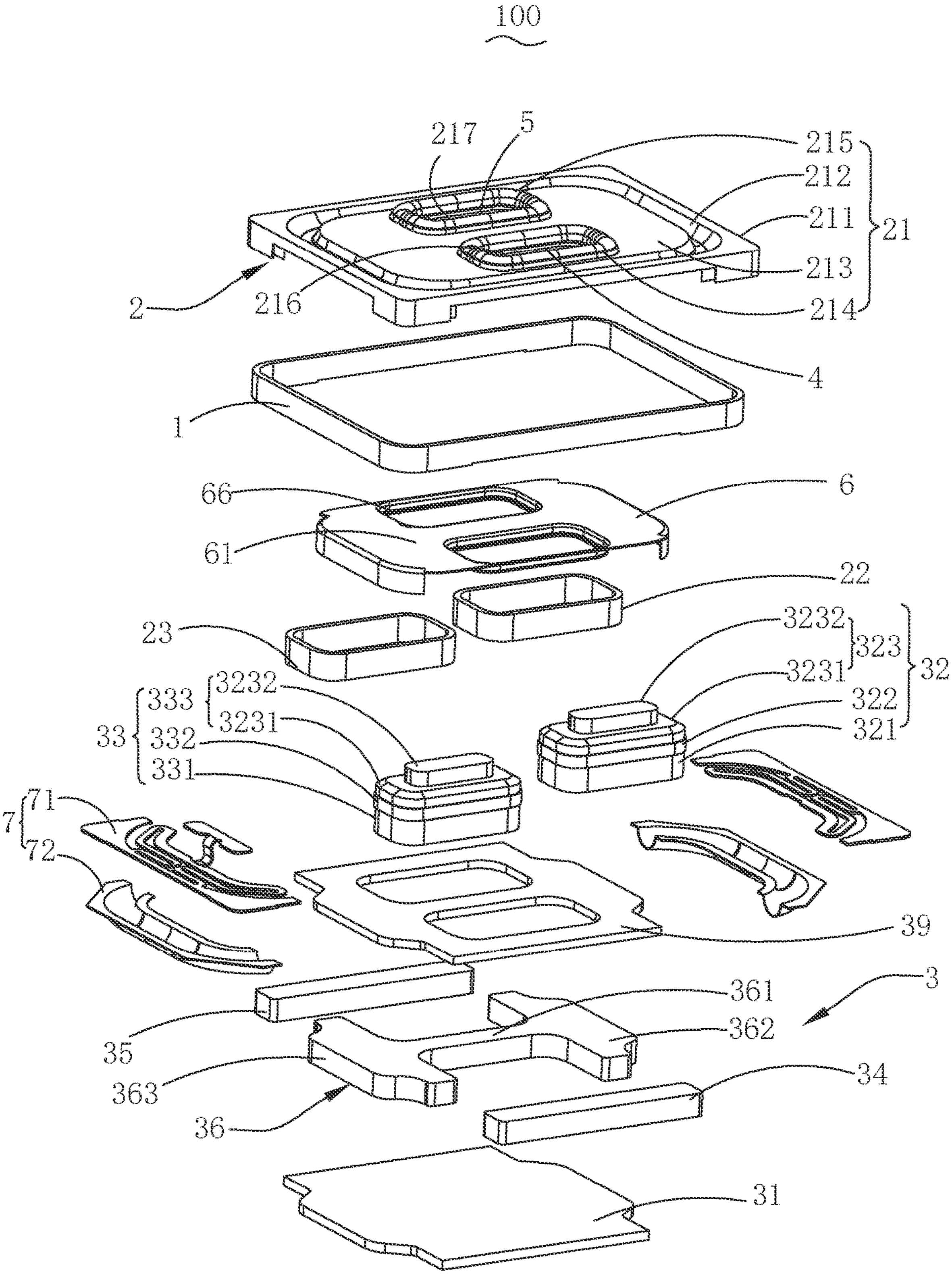
FIG. 2 shows an exploded view of the sounding device in FIG. 1.
Figure 3:
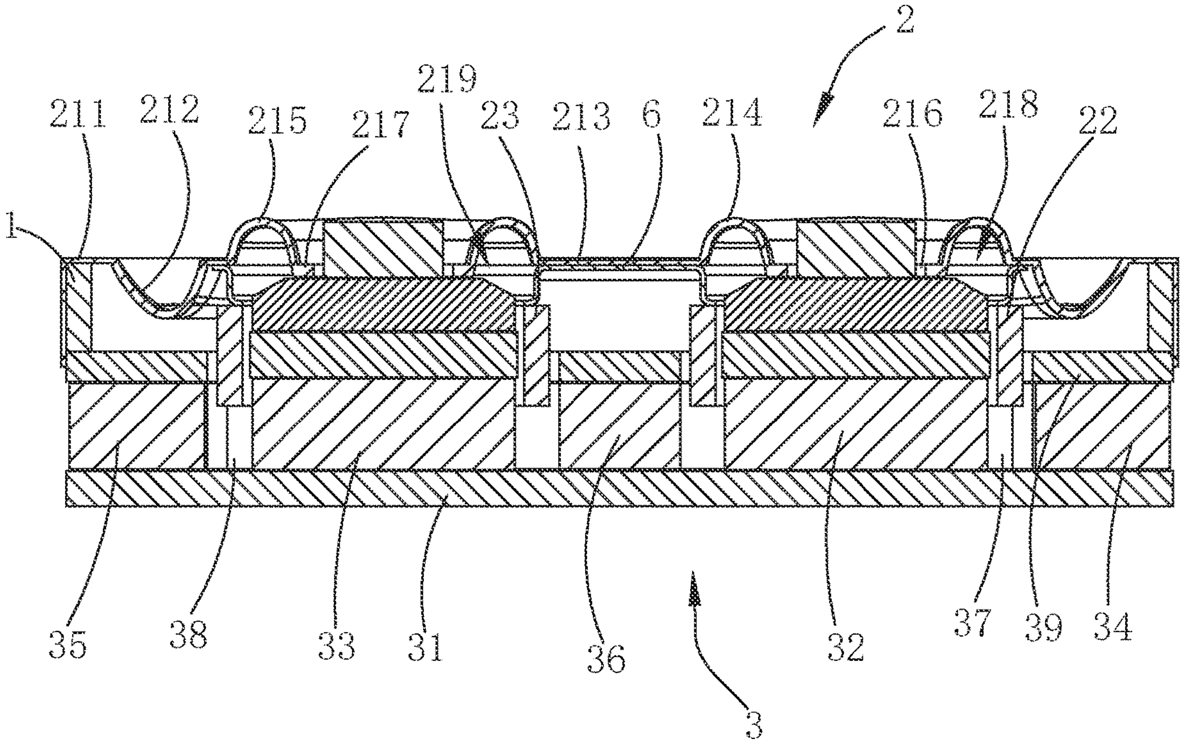
FIG. 3 shows a sectional view along line A-A in FIG. 1.
Figure 4:
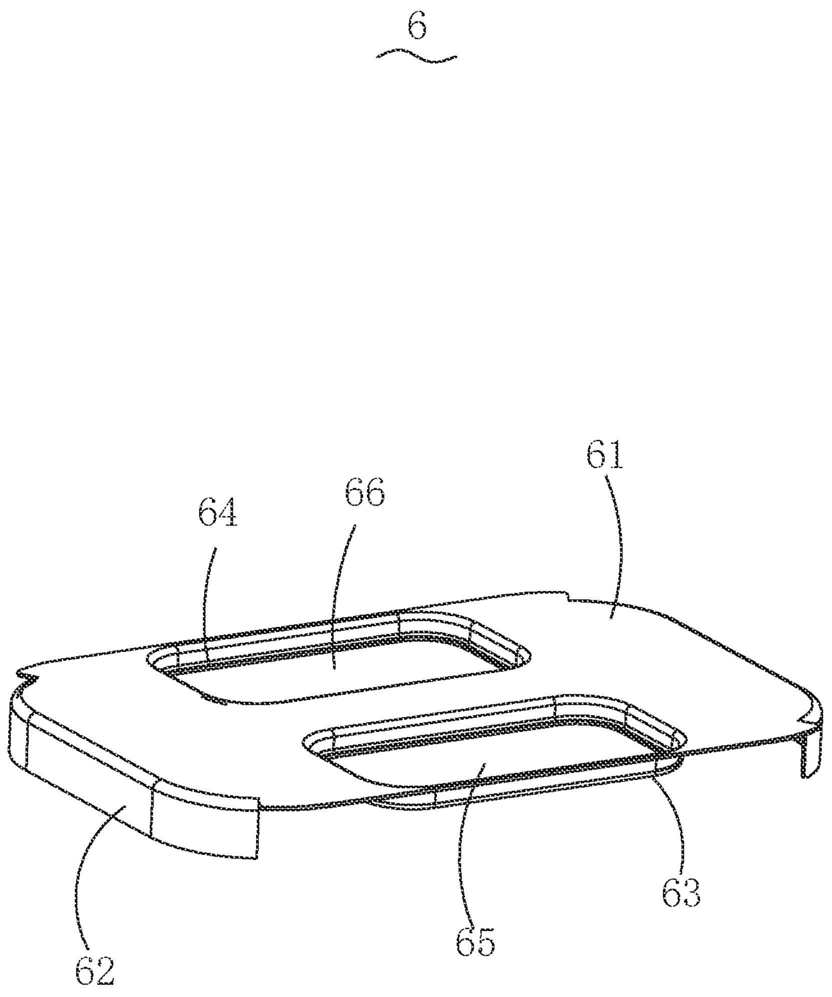
FIG. 4 shows a structural schematic diagram of a skeleton provided by an embodiment of the present application.
Figure 5:
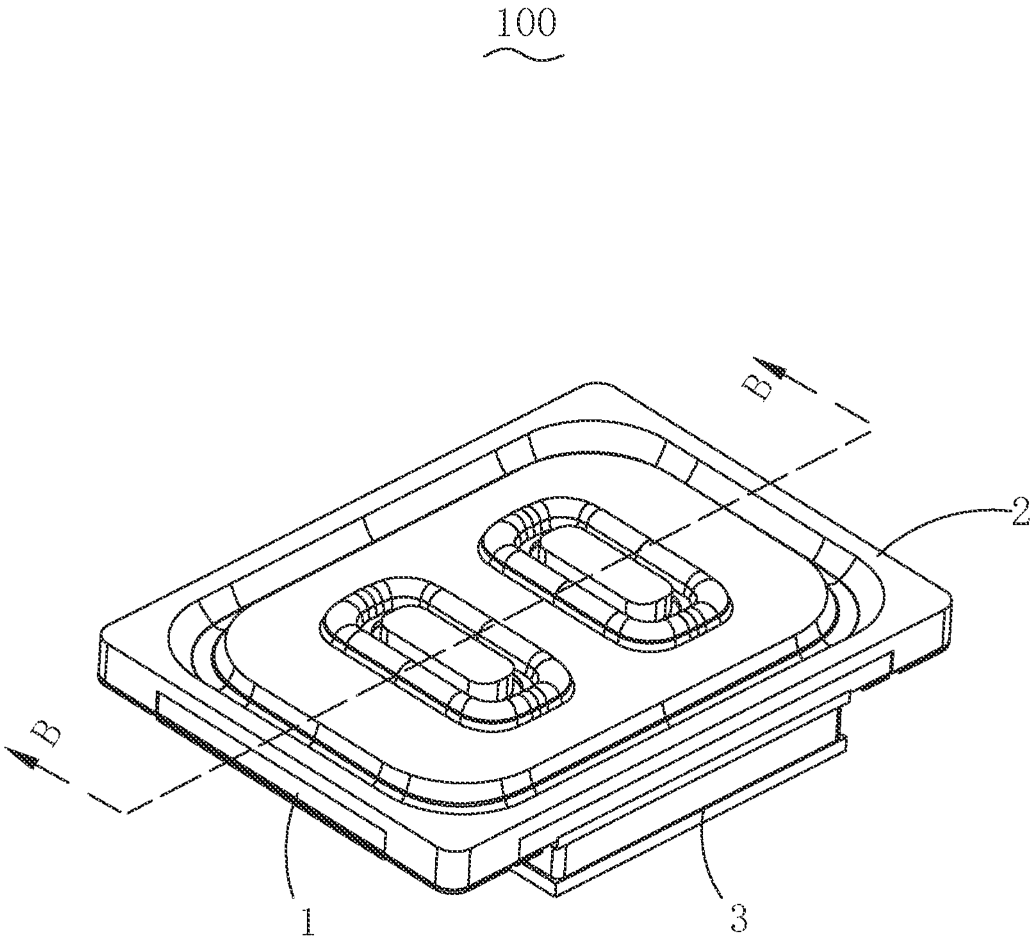
FIG. 5 shows a three-dimensional structural schematic view of the sounding device provided in another embodiment of the present application.
Figure 6:
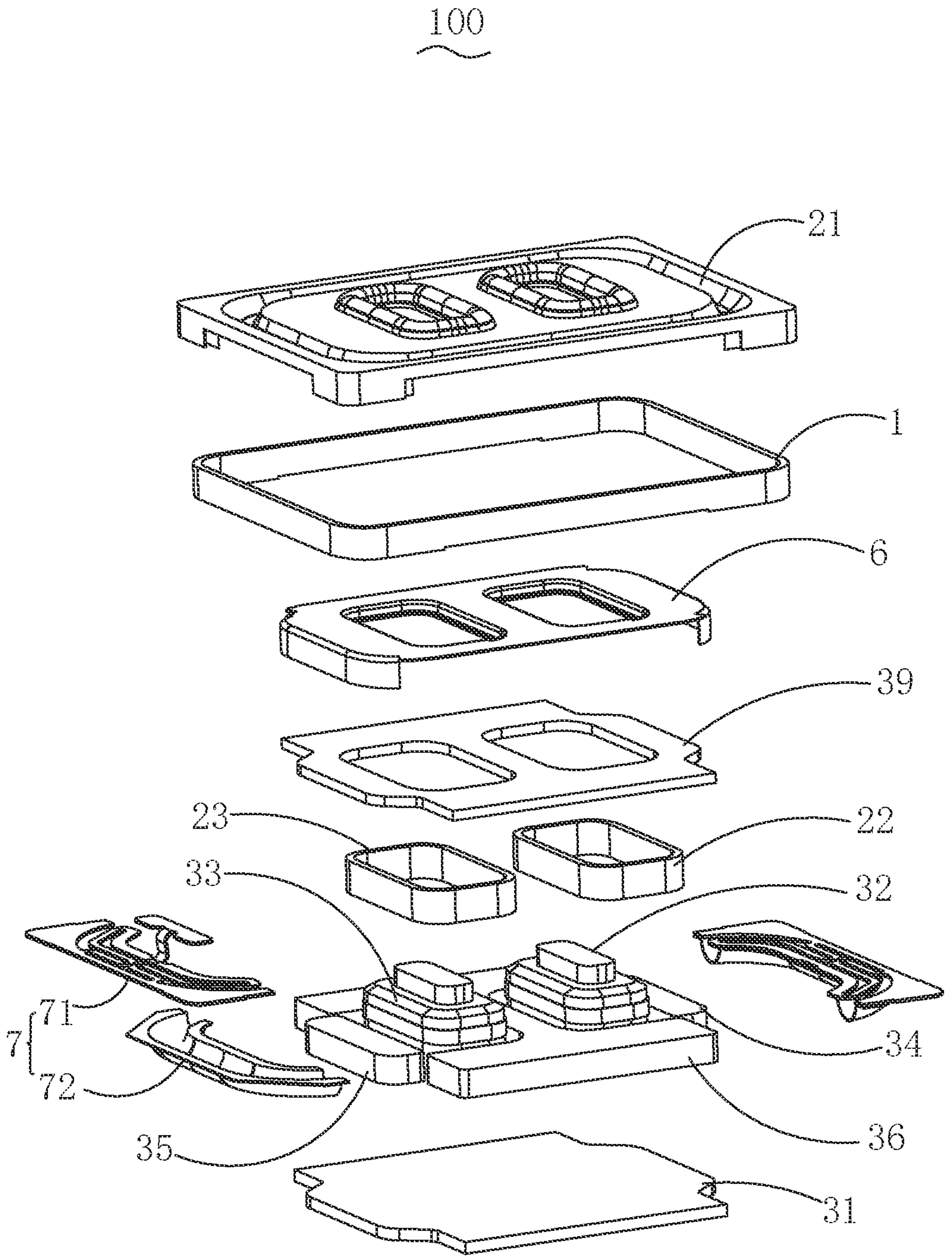
FIG. 6 shows an exploded view of the sounding device in FIG. 5.
Figure 7:
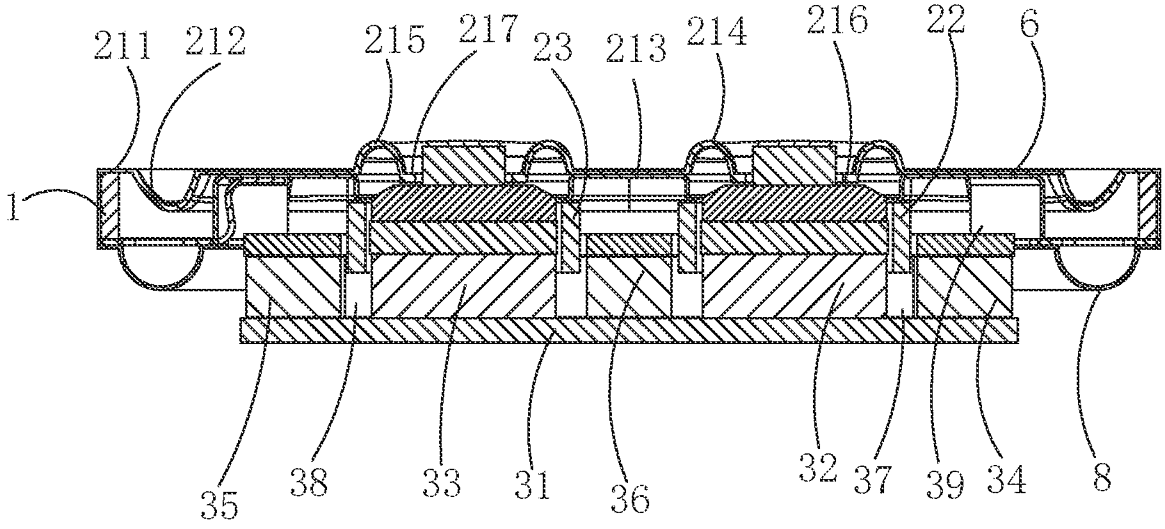
FIG. 7 shows a sectional view along line B-B in FIG. 5.
Figure 8:
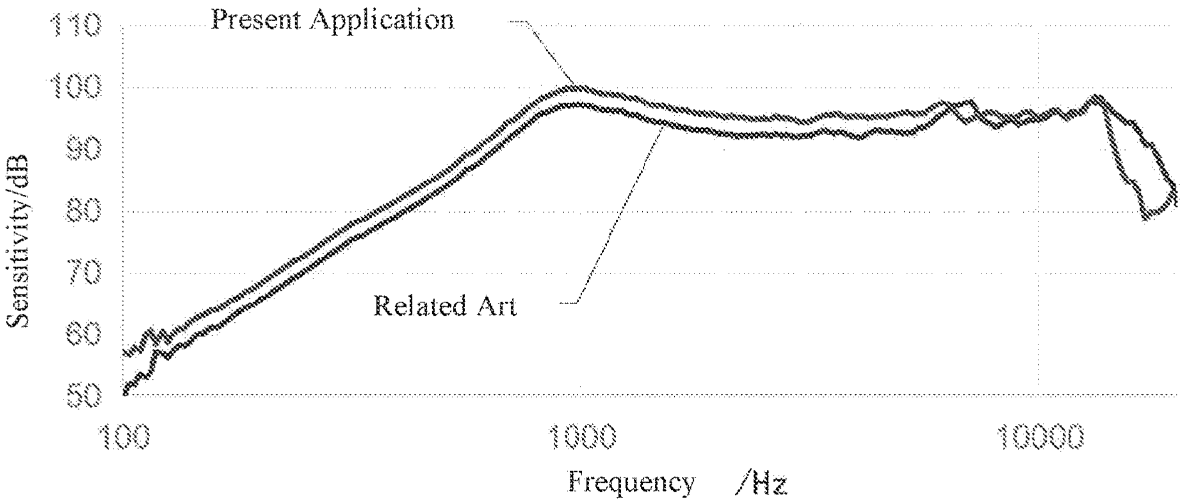
FIG. 8 shows a graph of the acoustic performance of the sounding device provided by an embodiment of the present application.

Combined with FIGS. 1 to 8, the embodiment of the present application provides a sounding device 100 including a basket frame 1, a vibration system 2 and a magnetic circuit system 3.

The basket frame 1 is configured to fixedly support the arrange the magnetic circuit system 3 and the vibration system 2.

The vibration system 2 includes a diaphragm 21 fixed at an outer peripheral edge to the basket frame 1, a first voice coil 22 and a second voice coil 23 configured to drive the diaphragm 21 to vibrate and produce sound. Both the first voice coil 22 and the second voice coil 23 can be connected in series and parallel to obtain a larger driving force and good vibration performance. In an embodiment, the first voice coil 22 and the second voice coil 23 are arranged along the long-axis direction of the sounding device 100, or the first voice coil 22 and the second voice coil 23 are arranged along the short-axis direction of the sounding device 100.

The magnetic circuit system 3 is fixed to the basket frame 1, and the magnetic circuit system 3 is provided with a first magnetic gap 37 and a second magnetic gap 38 that are spaced apart on a side of the magnetic circuit system 3 close to the vibration system 2. The first voice coil 22 is inserted and suspended within the first magnetic gap 37 and the second voice coil 23 is inserted and suspended within the second magnetic gap 38.

The magnetic circuit system 3 includes a lower clamping plate 31, a first center magnetic steel 32 and a second center magnetic steel 33 that are fixedly stacked on the lower clamping plate 31 and spaced apart from each other, a first sub-magnetic steel 34 and a second sub-magnetic steel 35 that are fixedly stacked on the lower clamping plate 31, and an irregular edge magnetic steel 36 fixedly stacked on the lower clamping plate 31. The irregular edge magnetic steel 36 is provided between the first center magnetic steel 32 and the second center magnetic steel 33. The first sub-magnetic steel 34 is arranged on a side of the first center magnetic steel 32 away from the irregular edge magnetic steel 36, and the second sub-magnetic steel 35 is arranged on a side of the second center magnetic steel 33 away from the irregular edge magnetic steel 36.

The first sub-magnetic steel 34 is located on a long-axis edge of the first center magnetic steel 32 and a side away from the irregular edge magnetic steel 36, and the second sub-magnetic steel 35 is located on a long-axis edge of the second center magnetic steel 33 and a side away from the irregular edge magnetic steel 36. A magnetic field generated by the first center magnetic steel 32, the second center magnetic steel 33, the first sub-magnetic steel 34, the second sub-magnetic steel 35, and the irregular edge magnetic steel 36 is configured to drive the first voice coil 22 and the second voice coil 23 to vibrate and produce sound.

The irregular edge magnetic steel 36 includes a side magnet body 361, a first side magnet 362 and a second side magnet 363 formed by bending and extending the two ends of the side magnet body 361, respectively. The side magnet body 361 is spaced between the first center magnetic steel 32 and the second center magnetic steel 33. The first side magnet 362 is located on one same side of the first center magnetic steel 32 and the second center magnetic steel 33, and the second side magnet 363 is located on the other same side of the first center magnetic steel 32 and the second center magnetic steel 33. The side magnet body 361, the first side magnet 362, the second side magnet 363, the first sub-magnetic steel 34, and the first center magnet jointly enclose the first magnetic gap 37. The side magnet body 361, the second side magnet 363, the side magnet body 361, the second side magnet 363, the second sub-magnetic steel 35, and the second center magnetic steel 33 jointly enclose the second magnetic gap 38. The first voice coil 22 and the second voice coil 23 are driven by the first center magnetic steel 32 and the second center magnetic steel 33 of the magnetic circuit system 3, respectively, so as to obtain a larger driving force and enhance the acoustic performance of the sounding device 100. The scope of application is wide, and the volume of the BOX rear cavity of the sounding device is $V<8\ cm^3$. The first side magnet 362 and the second side magnet 363 are located on both sides of the short axis of the first center magnetic steel 32 and the second center magnetic steel 33, respectively.

In this embodiment, the first center magnetic steel 32 includes a first main magnetic steel 321 fixedly stacked on the lower clamp 31, a first pole core 322 fixedly stacked on the first main magnetic steel 321, and a first magnetic member 323 fixedly stacked on the first pole core 322. The second center magnetic steel 33 includes a second main magnetic steel 331 fixedly stacked on the lower clamp 31, a second pole core 332 fixedly stacked on the second pole core 332, and a second magnetic member 333 fixedly stacked on the second pole core 332.

In this embodiment, the first magnetic member 323 includes a first magnetic member body 3231 fixedly stacked on the first pole core 322 and a tab-shaped first magnet extension portion 3232 formed by a protruding extension from a side of the first magnetic member body 3231 away from the first pole core 322. The second magnetic member 333 includes a second magnetic member body 3331 fixedly stacked on the second pole core 332 and a tab-shaped second magnet extension portion 3332 formed by an extension from a side of the second magnetic member body 3331 away from the second pole core 332.

In this embodiment, the diaphragm 21 includes a vibrating portion 213, an outer folded ring 212 in an annular shape and formed by extending from an outer peripheral edge of the vibrating portion 213, a fixing portion 211 formed by extending from an outer peripheral edge of the outer folded ring 212, a first avoiding hole 218 and a second avoiding hole 219 that are spaced apart from each other and arranged through the vibrating portion 213, a first folded ring 214 in an annular shape and formed by extending from the inner peripheral edge of the first avoiding hole 218, a second folded ring 215 in an annular shape and formed by extending from the inner peripheral edge of the second avoiding hole 219, a first support portion 216 formed by extending from the inner peripheral edge of the first folded ring 214, and a second support portion 217 formed by extending from the inner peripheral edge of the second folded ring 215. The first support portion 216 is fixedly stacked on a side of the first magnetic member body 3231 close to the diaphragm 21, and the second support portion 217 is fixedly stacked on a side of the second magnetic member body 3331 close to the diaphragm 21.

A first avoidance space 4 is formed throughout the first support portion 216, and a second avoidance space 5 is formed throughout the second support portion 217. The first magnet extension portion 3232 and the second magnet extension portion 3332 are provided in the first avoidance space 4 and the second avoidance space 5, respectively. Thus, it is convenient to mount the first magnetic steel unit and the second magnetic steel unit to increase the magnetic field performance of the magnetic circuit system 3 and further provide greater driving force, thereby enhancing the acoustic performance of the sounding device 100.

In this embodiment, the magnetic circuit system 3 further includes an upper clamping plate 39, and the upper clamping plate 39 is fixedly stacked on a side of the irregular edge magnetic steel 36 close to the vibration system 2, thereby improving the magnetic field performance of the magnetic circuit system 3.

In this embodiment, the sounding device 100 further includes a skeleton 6. The skeleton 6 is formed with oppositely arranged first through-hole 65 and second through-hole 66 throughout. The skeleton 6 is fixed to the diaphragm 21 on a side of the skeleton 6 close to the vibration system 2, and the first voice coil 22 and the second voice coil 23 are both fixed to a side of the skeleton 6 close to the diaphragm 21 and arranged around the first through-hole 65 and the second through-hole 66, respectively. A side of the first center magnetic steel 32 close to the vibration system 2 and a side of the second center magnetic steel 33 close to the vibration system 2 are arranged through the first through-hole 65 and the second through-hole 66, respectively. Thus, it is convenient to mount and fix the first voice coil 22 and the second voice coil 23 so that the first voice coil 22 and the second voice coil 23 are suspended within the first magnetic gap 37 and the second magnetic gap 38, respectively. By means of the double-hole setting of the first through-hole 65 and the second through-hole 66 on the skeleton 6, it is convenient to mount and set the first magnetic unit and the second magnetic unit, thereby saving the mounting space of the magnetic circuit system 3, while capable of obtaining a larger driving force and enhancing the acoustic performance of the sounding device 100.

In some embodiments, the first through-hole 65 and the second through-hole 66 are provided at relatively spaced intervals along an extension direction of the long axis of the skeleton 6.

In some embodiments, the first through-hole 65 and the second through-hole 66 are provided at relatively spaced intervals along an extension direction of the short axis of the skeleton 6.

In this embodiment, the skeleton 6 includes a skeleton body 61 provided with the first through-hole 65 and the second through-hole 66, and a first fixing portion 63 and a second fixing portion 64 bending and extending from hole walls of the first through-hole 65 and the second through-hole 66, respectively, towards a side close to the magnetic circuit system 3. The skeleton body 61 is fixed to the diaphragm 21, and the first voice coil 22 and the second voice coil 23 are fixed to a side of the first voice coil 22 close to the magnetic circuit system 3 and a side of the second voice coil 23 close to the magnetic circuit system 3, respectively. Thus, it is convenient for the first voice coil 22 and the second voice coil 23 to be suspended within the first magnetic gap 37 and the second magnetic gap 38, thereby improving the driving effect of the magnetic circuit system 3.

In this embodiment, the sounding device 100 further includes an elastic support assembly 7, and the skeleton 6 further includes extension portions 62 formed by bending and extending from opposite sides of the skeleton body 61 toward the magnetic circuit system 3. One end of the elastic support assembly 7 is fixed to the basket frame 1, and the other end of the elastic support assembly 7 is fixed to the extension portions 62.

The elastic support assembly 7 includes an elastic member 71 and an auxiliary diaphragm 72. One end of the elastic member 71 is fixed to the basket frame 1, and the other end of the elastic member 71 is fixed to the extension portion 62. The auxiliary diaphragm 72 is affixed and fixed to a side of the elastic member 71 away from the vibration system 2. The elastic member 71 may be a flexible printed circuit (FPC), so the voice coil may be electrically connected to the FPC, and may also be configured to introduce an electrical signal to the voice coil, avoiding breakage of wires by means of leads. The elastic member 71 may also be directly connected to the voice coil or indirectly connected to the voice coil through the skeleton 6. The auxiliary diaphragm 8 is fixed to the side of the basket frame 1 away from the diaphragm. The auxiliary diaphragm 8 increases the vibration strength of the diaphragm 21 to improve the sound loudness and sensitivity, and prevents the voice coil from vibrating with lateral oscillations to improve reliability.

In this embodiment, a bending direction of the auxiliary diaphragm 8 is the same as a bending direction of the outer folded ring 212.

In this embodiment, when the frequency of the sounding device 100 is within 10,000 Hz, the sensitivity of the sounding device 100 is significantly higher than that of the sounding device in the related art, thereby obtaining good sounding performance.

Compared to the prior art, in the sounding device of the present application, a first voice coil and a second voice coil are provided in a single diaphragm, and the first voice coil and the second voice coil can be connected in series and in parallel. The irregular edge magnetic steel is provided between the first center magnetic steel and the second center magnetic steel, and the first sub-magnetic steel is located on a side of the first center magnetic steel away from the irregular edge magnetic steel, and the second sub-magnet steel is located on a side of the second center magnetic steel away from the irregular edge magnetic steel. The side magnet body of the irregular edge magnetic steel is spaced between the first center magnetic steel and the second center magnetic steel. The first side magnet is located on one same side of the first center magnetic steel and the second center magnetic steel, and the second side magnet is located on the other same side of the first center magnetic steel and the second center magnetic steel. The side magnet body, the first side magnet, the first sub-magnetic steel and the first center magnetic steel jointly enclose the first magnetic gap; the side magnet body, the second side magnet, the second sub-magnetic steel and the second center magnetic steel jointly enclose the second magnetic gap; the first voice coil and the second voice coil are driven by the corresponding first center magnetic steel and second center magnetic steel of the magnetic circuit system, respectively, thereby obtaining a larger driving force and improving the acoustic performance of the sounding device.

Described above are only some embodiments of the present application, and it should be pointed out herein that, for those of ordinary skill in the field, improvements may be made without departing from the creative concept of the present application, but these are within the protection scope of the present application.

What is claimed is:

1. A sounding device, comprising:

a basket frame;

a vibration system, comprising a diaphragm fixed to the basket frame at an outer peripheral edge, and a first voice coil and a second voice coil that are configured to drive the diaphragm to vibrate to produce sound; and a magnetic circuit system, wherein the magnetic circuit system is fixed to the basket frame and is provided with a first magnetic gap and a second magnetic gap spaced apart on a side of the magnetic circuit system close to the vibration system; the first voice coil is inserted and suspended in the first magnetic gap, and the second voice coil is inserted and suspended in the second magnetic gap;

wherein the magnetic circuit system comprises a lower clamping plate, a first center magnetic steel and a second center magnetic steel fixedly stacked on the lower clamping plate and spaced apart from each other, and an irregular edge magnetic steel fixedly stacked on the lower clamping plate; the irregular edge magnetic steel is provided between the first center magnetic steel and the second center magnetic steel; the first sub-magnet is located on a side of the first center magnetic steel away from the irregular edge magnetic steel, and the second sub-magnetic steel is located on a side of the second center magnetic steel away from the irregular edge magnetic steel;

the irregular edge magnetic steel comprises a side magnet body, a first side magnet and a second side magnet formed by bending and extending both ends of the side magnet body, respectively; wherein the side magnet body is spaced between the first center magnetic steel and the second center magnetic steel; the first side magnet is located at one same side of the first center magnetic steel and the second center magnetic steel, the second side magnet is located at the other same side of the first center magnetic steel and the second center magnetic steel; the side magnet body, the first side magnet, the first sub-magnetic steel, and the first center magnetic steel jointly enclose the first magnetic gap; the side magnet body, the second side magnet, the second sub-magnetic steel, and the second center magnetic steel jointly enclose the second magnetic gap.

2. The sounding device of claim 1, wherein the first center magnetic steel comprises a first main magnetic steel fixedly stacked on the lower clamping plate, a first pole core fixedly stacked on the first main magnetic steel, and a first magnetic member fixedly stacked on the first pole core;

the second center magnetic steel comprises a second main magnetic steel fixedly stacked on the lower clamping plate, a second pole core fixedly stacked on the second main magnetic steel, and a second magnetic member fixedly stacked on the second pole core.

3. The sounding device of claim 2, wherein the first magnetic member comprises a first magnetic member body fixedly stacked on the first pole core, and a tab-shaped first magnet extension portion formed by a protruding extension of a side of the first magnetic member body away from the first pole core;

the second magnetic member comprises a second magnetic member body fixedly stacked on the second pole core, and a tab-shaped second magnet extension portion formed by an extension of a side of the second magnetic member body away from the second pole core.

4. The sounding device of claim 3, wherein the diaphragm comprises a vibrating portion, an outer folded ring in an annular shape and extending from an outer peripheral edge of the vibrating portion, a fixing portion extending from an outer peripheral edge of the outer folded ring and fixed to the basket frame, a first avoiding hole and a second avoiding hole spaced apart from each other and arranged through the vibrating portion, a first inner folded ring in an annular shape and extending from an inner peripheral edge of the first avoiding hole, a second inner folded ring in an annular shape and extending from an inner peripheral edge of the second avoiding hole, a first support portion extending from an inner peripheral edge of the first inner folded ring, and a second support portion extending from an inner peripheral edge of the second inner folded ring; wherein the first support portion is fixedly stacked on a side of the first magnetic member body close to the diaphragm, and the second support portion is fixedly stacked on a side of the second magnetic member body close to the diaphragm;

a first avoidance space is formed throughout the first support portion, and a second avoidance space is formed throughout the second support portion; the first magnet extension portion and the second magnet extension portion are arranged within the first avoidance space and the second avoidance space, respectively.

5. The sounding device of claim 1, wherein the magnetic circuit system further comprises an upper clamping plate; the upper clamping plate is fixedly stacked on a side of the irregular edge magnetic steel close to the vibration system.

6. The sounding device of claim 1, further comprising a skeleton, wherein the skeleton is provided with a first through-hole and a second through-hole oppositely arranged and formed throughout the skeleton; a side of the skeleton close to the vibration system is fixed to the diaphragm; the first voice coil and the second voice coil are both fixed to a side of the skeleton away from the diaphragm and arranged around the first through-hole and the second through-hole, respectively; a side of the first center magnetic steel close to the vibration system and a side of the second center magnetic steel close to the vibration system are arranged through the first through-hole and the second through-hole, respectively.

7. The sounding device of claim 6, wherein the skeleton comprises a skeleton body provided with the first through-hole and the second through-hole, and a first fixing portion and a second fixing portion formed by bending and extending from walls of the first through-hole and the second through-hole, respectively, to a side close to the magnetic circuit system; the skeleton body is fixed to the diaphragm, and the first voice coil and the second voice coil are fixed to a side of the first fixing portion close to the magnetic circuit system and a side of the second voice coil close to the magnetic circuit system, respectively.

8. The sounding device of claim 7, further comprising an elastic support assembly; the skeleton further comprises an extension portion formed by bending and extending from opposite sides of the skeleton body toward the magnetic circuit system; one end of the elastic support assembly is fixed to the basket frame, and the other end of the elastic support assembly is fixed to the extension portion.

9. The sounding device of claim 8, wherein the elastic support assembly comprises an elastic member and an auxiliary diaphragm; one end of the elastic member is fixed to the basket frame, the other end of the elastic member is fixed to the extension portion; and the auxiliary diaphragm is affixed and fixed to a side of the elastic member away from the vibration system.

* * * * *